United States Patent [19]

Lodge

[11] 4,088,810
[45] May 9, 1978

[54] ALKALI METAL SILICATE-ZINC HYDROXYCHLORIDE COATING COMPOSITION

[75] Inventor: James R. Lodge, Saint Paul, Minn.

[73] Assignee: Minnesota Mining and Manufacturing Company, Saint Paul, Minn.

[21] Appl. No.: 358,030

[22] Filed: May 7, 1973

[51] Int. Cl.$^2$ .................... B32B 13/04; B32B 11/04
[52] U.S. Cl. .................... 428/446; 427/372 B; 428/448
[58] Field of Search ............ 117/123 A, 169 A; 106/15 AF, 74, 84; 424/145; 423/462, 472; 427/372, 372 B; 428/142, 446, 448, 489, 539

[56] References Cited

U.S. PATENT DOCUMENTS

| | | | |
|---|---|---|---|
| 1,248,022 | 11/1917 | Seidenschaurr | 424/145 |
| 1,923,769 | 8/1933 | Wood | 106/84 |
| 2,310,128 | 2/1943 | Smith | 117/123 A |
| 2,354,351 | 7/1944 | Schuetz | 117/169 A |
| 2,379,358 | 6/1945 | Jewett | 117/100 D |
| 2,769,716 | 11/1956 | Rankin | 106/15 AF |
| 2,943,002 | 5/1959 | Langseth | 106/84 |
| 3,333,973 | 8/1967 | Freiman | 106/74 |
| 3,423,229 | 1/1969 | Kompanek | 117/169 A |
| 3,494,727 | 2/1970 | Rapaport | 106/15 AF |
| 3,507,676 | 4/1970 | McMahon | 106/15 AF |
| 3,528,842 | 9/1970 | Skadulis | 106/84 |
| 3,709,050 | 10/1973 | Terry | 106/84 |
| 3,784,357 | 1/1974 | Muvaoka | 106/15 AF |

OTHER PUBLICATIONS

Hockh's Chemical Dictionary, 4th Ed., 1969, p. 482.
Chemical Abstracts, 1967–1971, Subject Index, p. 33457s.

*Primary Examiner*—James R. Hoffman
*Attorney, Agent, or Firm*—Cruzan Alexander; Donald M. Sell; William G. Ewert

[57] ABSTRACT

An aqueous, alkaline, inorganic composition, comprising water-soluble alkali metal silicate and zinc hydroxychloride, is used to coat substrates normally infested by algae, such as silicate-containing building material, e.g., concrete roofing tiles, to prevent or minimize algal infestation on said substrates, said algae otherwise imparting a dark, unsightly appearance thereto.

11 Claims, No Drawings

ALKALI METAL SILICATE-ZINC HYDROXYCHLORIDE COATING COMPOSITION

BACKGROUND OF THE INVENTION

This invention relates to a composition useful in coating substrates normally infested by algae, such as silicate-containing building material, e.g., concrete roofing tiles, to render said substrate resistant to algal infestation.

For many years there has been a so-called fungus or mildew problem associated with the concrete tiles used on roofs of dwellings in the coastal areas of Florida. The problem manifests itself as a severe discoloration of the roofs, creating an unsightly appearance thereof. The dominant microorganism causing the problem is not fungus but rather *Gloeocapsa magma,* a blue-green alga, although other strains of algae and sometimes fungi are found. The algae produce irregular, dark blotches in about ½ to 2 years, the blotches continually increasing in area, generally as dark streaks on sloping roofs, and, if not remedied, the algal infestation eventually results in discoloration of the entire roof. A new roof of concrete tiles can change from a pleasing white appearance to an unsightly black appearance, e.g. in 1 to 5 years, if remedial steps are not taken. In addition to being unsightly, dark-colored roofs absorb large amounts of solar energy, such roofs being particularly undesirable in warm, sunny climates such as the Gulf Coast.

Present practice to remedy the discoloration of algae infested roofs entails cleaning and painting them on a regular basis. Commonly, the roof is first treated with a strong algicide, e.g. sodium hypochlorite, to kill the algae and steam or a high pressure water spray is then used to remove the algae residue. Then an organic coating, such as an acrylic or vinyl paint, often blended with Portland cement, whiting, or other filler, is applied. The organic paints are usually ready hosts for any types of microorganisms and do not prevent the renewed discoloration by the microorganisms; the discoloration normally returns in about 6 to 18 months, necessitating further cleaning and repainting. The discoloration is aggravated because organic-based paints tend to yellow with age and deteriorate upon exposure to ultraviolet radiation. Numerous organic compounds have been added to the paints in an attempt to control or prevent the growth of algae on roofs. These compounds generally do not provide long-lasting effects because of their poor weather resistance, and discoloration occurs nearly as soon as if the compounds were not used. Many of the compounds used for this purpose contain mercury and the use of mercury compounds is being restricted for ecological reasons.

Algicidal roofing granules coated with a fired inorganic alkali metal silicate containing zinc, zinc oxide, or zinc sulfide are known (see U.S. Pat. No. 3,507,676). Roofing granules coated with zinc oxychloride containing a coloring material are also known (see U.S. Pat. No. 2,091,991), the zinc compound being used to obtain good bonding action between the base granules and the coloring material.

Coating of substrates, such as concrete, with an anhydrous mixture of zinc chloride dissolved in a volatile anhydrous solvent and zinc oxide to form a zinc oxychloride coating is also known (see U.S. Pat. No. 2,310,128). Zinc oxychloride has also been used to coat zinc oxide pigment used in organic coatings, linoleum, rubber, textiles, etc., in an effort to inhibit the growth of fungus, mold, mildew, and the like (see U.S. Pat. No. 2,769,716).

Briefly, the aqueous, alkaline, inorganic coating composition of this invention comprises a solution of water-soluble alkali metal silicate with zinc hydroxychloride dispersed in said solution. The composition is applied to a substrate, e.g., by brushing, and allowed to dry under normal ambient temperatures, thereby forming a hard, durable, weather-resistant, water permeable, substantially water insoluble coating on the substrate that renders the substrate resistant to algal infestation which otherwise would impart a dark, unsightly appearance thereto.

The water-soluble alkali metal silicates used in this invention are well-known materials and have been used as coatings for roofing granules (e.g., see U.S. Pat. No. 2,379,358). Though any of these silicates can be used herein, the preferred alkali metal silicate in the practice of this invention is sodium silicate because of its relatively low cost and ready availability, and this invention will be exemplified by that silicate.

The sodium silicate is used in preparing the coating composition of this invention in the form of an aqueous solution thereof. The concentration of the silicate solution can vary and generally will be dictated by the viscosity desired in the coating composition after the zinc hydroxychloride is mixed with the silicate solution, that viscosity being such as to facilitate the mode of application of the coating composition to the desired substrate. For example, where the zinc hydroxychloride is added to the silicate solution in the form of an aqueous paste (containing, for example, 45 to 65 weight percent water) and the resultant coating composition is to be applied to the substrate by brushing, the sodium silicate solution used in making up such a coating composition will generally contain about 65 to 75 weight percent water.

Sodium silicates useful in the practice of this invention generally will have a weight ratio of $Na_2O:SiO_2$ of 1:2.75 to 1:3.75. Aqueous sodium silicate solutions which are commercially available and can be used in making up the coating composition of this invention include those sold under the trademarks "Pd," "K," "N," "O," and "S-35," which are obtainable from the Philadelphia Quartz Company. Generally, these commercial products contain about 60 weight percent water and may have to be diluted when used in preparing the coating compositions of this invention to provide the aforementioned concentration. Further information on the nature of alkali metal silicates useful in the practice of this invention will be omitted in the interest of brevity, reference being made to "Soluble Silicates: Their Properties and Uses," J. G. Vail, Reinhold Publishing Co., New York (1952), for a further description thereof.

The zinc hydroxychloride used in this invention is a water-insoluble zinc compound which has the formula $Zn_5(OH)_8Cl_2.H_2O$. Though for purposes of this invention the non-hydrated zinc compound, $Zn_5(OH)_8Cl_2$, is equivalent to this hydrated form, the invention is exemplified herein by the use of the hydrated form.

The zinc hydroxychloride can be admixed with the alkali metal silicate solution in any practical form, such as a dry powder or, preferably, as an aqueous paste (the preparation of which is described in the example hereinbelow). The amount of zinc hydroxychloride added to the silicate solution can vary and is sufficient to cause the applied coating composition to become substantially water insoluble in the course of drying the applied coating composition. (Minor water-soluble components, such as NaCl, in the dried coating may be formed and leached from the coating by rainwater but these components are not detrimental to the utility of the coating nor do they diminish the essentially water-insoluble nature of the dried coating.) Generally, the amount of zinc hydroxychloride used in preparing the coating composition will be that sufficient to provide at least 0.5 mole per mole of the alkali metal silicate used, and preferably will be about 0.8 to 1 mole per mole of silicate. Amounts of zinc hydroxychloride less than about said 0.5 mole will generally impart algicidal activity to the dried coating but the coating will not be as water insoluble as desired. On the other hand, an amount of zinc hydroxychloride greater than about 1 mole does not provide any added benefit and may tend to cause chalking of the dried coating or otherwise affect its integrity.

The amount of water in the coating composition of this invention can vary and will be dependent on the particular mode of application chosen to apply the coating composition to the substrate. Some modes of application, such as spraying, may require a lower viscosity, i.e., a greater amount of water, than other modes, e.g., brushing. Generally, however, the coating composition will contain about 55 to 70 weight percent, preferably about 60 to 65 weight percent, water, the balance being silicate and zinc hydroxychloride solids.

The coating composition dries to a white coating, the zinc hydroxychloride functioning to provide the white color. (The whitening effect of the zinc hydroxychloride is greater than that obtained by mixing the silicate component with an equivalent amount of zinc oxide pigment.) If other colors for the coating of this invention are desired, various pigments, e.g., cobalt aluminate for blue, chromium oxide for green, titanium dioxide for additional whiteness, and ferric oxide for red, as well as other well-known pigments, can be added to the silicate or zinc components prior to mixing or to the composition after mixing the two essential components.

The coating composition of this invention is fairly stable and can be stored for several weeks but because there is a gradual gelling, which may hamper application of the composition to a substrate, and thus make the coating operation less efficient, it is preferred to mix the silicate solution and zinc hydroxychloride shortly before the resulting coating composition is applied to the substrate. Thus, the coating composition can be stored, shipped and marketed as a two-part or two-package system.

Any substrate which is normally susceptible to algal infestation, and the consequent discoloration produced by algae growth thereon, can be coated with the coating composition of this invention. Normally such substrates will be relatively rigid, inorganic, exterior building or dwelling structures found in the coastal areas of Florida, and other regions of high temperature and humidity, which are exposed to the air-borne microorganisms. Generally, these substrates will be made of or contain silicates, such as Portland cement concrete, fired clay, and mineral granules used in roofing or siding. The most prevalent and noticeable substrate where this invention finds particular applicability is concrete roofing tiles which, as mentioned hereinbefore, are particularly susceptible to algal infestation and develop an unsightly dark appearance because of such infestation.

The coating composition of this invention can be applied to a new, or relatively new, or old and weathered substrate, for example the concrete roofing tiles of a house. The coating composition can be applied to a substrate which is relatively old and infested though before doing so it will be preferable to clean the substrate of dirt or algal infestation to insure good adhesion of the coating to the substrate. A particularly desirable cleaning technique will be the aforementioned sodium hypochlorite cleaning with subsequent washing to remove foreign matter from the substrate.

The applied coating composition is allowed to dry at ambient temperatures (e.g., 60° to 100° F.) for several hours, or preferably overnight, and a second application can be applied thereafter if desired. If rain is anticipated, the application of the coating composition should be postponed until after the rain and after the substrate is dry; if a coated substrate is rained on before the coating is sufficiently dry, the sodium silicate may still be significantly water soluble and the rain may well carry away some of the silicate before its insolubilization, necessitating a reapplication of the coating. Where the coating composition is to be applied to shingles or other roofs having granules embedded in asphalt, it may be desirable to first prime the surface to insure good adhesion of the coating, or suitable wetting agents may be added to the coating composition to insure good adhesion. It is also within the scope of this invention to coat the building materials in the course of their manufacture before a structure is built; for example, concrete roofing tiles can be coated in accordance with this invention in the manufacturing plant where the tiles are made.

The amount of coating composition applied to the substrate can vary and, functionally stated, the amount applied to the substrate will be that sufficient to render the substrate resistant to algal infestation. Generally, about 1 to 20 pounds, preferably 5 to 15 pounds, of coating composition per 100 square feet of substrate will be sufficient to provide adequate coverage for that purpose, although lighter and heavier coatings can be applied, the heavier coatings preferably being applied in several steps with drying of each coating before application of the next. The dry coating will have at least about 0.2 pound of chemically combined zinc per 100 square feet of surface area; generally, the amount of said zinc will be 0.8 to 2.5 pounds per 100 square feet.

In addition to rendering the substrate resistant to algal infestation and insuring a long-lasting pleasing appearance, the coating of this invention provides significant fire-proofing, particularly where the substrate is a mineral-surfaced asphalt roofing. This is due to the non-flammable nature of the coating, it being inorganic, and the capability of the coating to form a crust which restricts burning and flowing of asphalt when the same is subjected to the heat of a fire. The coating of this invention is also relatively permeable or "breathable;" thus, it is not a barrier and water or water vapor may escape from or pass through the coated substrate.

Objects and advantages of this invention are further illustrated in the following example but the various materials and amounts thereof, and other details in the example, should not be construed to unduly limit the scope of this invention. In the example, all parts given are by weight unless otherwise noted.

EXAMPLE I

A water solution of sodium silicate was made by diluting 116.4 parts of a commercially available sodium silicate solution ("N" brand, having a $Na_2O:SiO_2$ weight ratio of 1:3.22 and a specific gravity of 1.39) with 43.5 parts water, this diluted solution hereinafter referred to as "Part A."

A 20 wt. % aqueous solution of zinc chloride was made by dissolving 2.45 parts anhydrous zinc chloride in about 100 parts water. To this solution, 52 parts of pigment grade zinc oxide was added with vigorous stirring. When the resulting slurry was smooth and free of lumps, it was poured into polyethylene molds, which were then covered to prevent evaporation. The slurry hardened in about 5 to 10 min. and was allowed to age for at least 24 hrs. to substantially complete the reaction of the zinc oxide and zinc chloride to zinc hydroxychloride. (As an alternative to aging, the poured slurry can be heated and kept at elevated temperature, e.g. 150° F., for about 30 min.). The resulting solid zinc hydroxychloride was removed from the molds, broken into pieces about 1 inch in size, and milled 4 hrs. in a ball mill with a porcelain grinding medium using about 1¼ parts water for each part zinc hydrochloride. The resulting slurry was neutralized with a 20 wt. % sodium hydroxide solution until slightly alkaline to phenolphthalein to neutralize any unreacted zinc chloride, and the neutralized slurry was filtered to form a stiff paste containing about 42 wt. % solids, said paste hereinafter referred to as "Part B."

About 1.2 parts of Part A were stirred into 5.82 parts of Part B, and the mixture stirred for about 2 min. Then 4 further parts of Part A were added slowly to the mixture with stirring until the mixture was smooth and free of lumps. (A well-dispersed paste of a tinting pigment can be added if desired at this point or such pigment can be added during the ball-milling of Part B.) In this coating composition, there are about 0.82 mole of zinc hydroxychloride per mole of silicate and about 64 wt. % water, the balance being the silicate and zinc hydroxychloride solids.

A thin coating of the coating composition was applied to a cleaned concrete tile roof in southeastern Florida using standard paint brushes and rollers. The coating was allowed to dry overnight and a similar second coat was applied over the first. The total coating composition (wet) amounted to about 11 pounds per 100 sq. ft. of roof surface area. The total coating contained about 1.75 pounds of chemically combined zinc per 100 sq. ft. of surface area. The coated roof remained white and was free of algae when examined 12 months later. Other concrete tile roofs in the area which were not so coated showed definite algae discoloration 6 months after cleaning and panting with conventional pants.

EXAMPLE II

Samples of Portland cement concrete tiles, concrete blocks, and mineral-surfaced asphalt shingles were coated as described in Example I. The coated samples were tested for resistance to the growth of algae by attaching them to a test rack positioned at a 45° angle and facing north near Houston, Texas. In order to intensify the exposure to algal infection, an algae infested seed shingle, removed from an infested roof, was placed on the rack directly above the coated test samples, and a further algae infested seed shingle was placed on the rack directly below the test samples. This arrangement permitted rainwater to run from the surface of the top seed shingle down across the surface of the test samples and thence down across the bottom seed shingle. Upon examining the rack after a period of 15 months of exposure, the coated test samples were found to be as white as they originally appeared and showed no visual evidence of algae growth; the lowermost seed shingles were found to have significantly less algae growth than the top seed shingle and, in fact, considerably less growth than it originally had at the outset of the test period. This test demonstrated the resistance of the coated substrates of this invention to algal infestation and the algicidal nature of the coated substrates.

Various modifications and alterations of this invention will be obvious to one skilled in the art without departing from the spirit and scope of this invention, and it should be understood that this embodiment is not to be limited to the illustrative embodiments set forth herein.

What is claimed is:

1. A method of forming a hard, durable, water-insoluble, water-permeable, weather-resistant, inorganic, algicidal coating on a relatively rigid inorganic substrate useful as exterior building material, comprising the steps of applying to said substrate an inorganic coating composition comprising about 55 to 70 weight percent water, a water-soluble sodium silicate having an $Na_2O:SiO_2$ weight ratio of 1:2.75 to 1:3.75, and zinc hydroxychloride of the formula $Zn_5(OH)_8Cl_2$, there being in said composition at least 0.5 mole of said zinc hydroxychloride for each mole of said sodium silicate, and drying the resulting applied composition at ambient temperature of about 60 to 100° F to insolubilize said silicate and form said coating.

2. The method of claim 1 wherein said substrate is a silicate-containing substrate.

3. The method of claim 1 wherein said substrate is a Portland cement concrete substrate.

4. The method of claim 1 wherein said substrate is a silicate mineral-surfaced asphalt roofing.

5. A method of forming a hard, durable, water-insoluble, water-permeable, weather-resistant, inorganic, algicidal coating on a concrete substrate, comprising the steps of applying to said substrate an inorganic coating composition comprising about 55 to 70 weight percent water, a water-soluble sodium silicate having an $Na_2O:SiO_2$ weight ratio of 1:2.75 to 1:3.75, and zinc hydroxychloride of the formula $Zn_5(OH)_8Cl_2.H_2O$, there being in said composition about 0.5 to 1.0 mole of said zinc hydroxychloride for each mole of said sodium silicate, and drying the resulting applied composition at ambient temperature of 60° to 100° F to insolubilize said sodium silicate and form said coating.

6. A method of preventing algae infestation of a Portland cement concrete roof, which comprises mixing an aqueous inorganic solution containing 25 to 35 weight percent water-soluble sodium silicate, having an $Na_2O:SiO_2$ weight ratio of 1:3.22, with an aqueous paste comprising 35 to 55 weight percent zinc hydroxychloride, of the formula $Zn_5(OH)_8Cl_2.H_2O$, to form a coating composition containing about 55 to 70 weight percent water and about 0.5 to 1 mole of said zinc hydroxychloride per mole of said sodium silicate, applying said coating composition to said roof in the amount of 1 to 20 pounds per 100 square feet of roof area, and drying the applied coating composition at ambient temperature of about 60° to 100° F to insolubilize said sodium silicate and form a hard, durable, water-insoluble, water-permeable, weather-resistant, inorganic, algicidal coating on said roof.

7. Exterior building material comprising a relatively rigid, inorganic substrate coated with a hard, durable, water-insoluble, water-permeable, weather-resistant inorganic, algicidal coating of a normally water-soluble sodium silicate, having an $Na_2O:SiO_2$ weight ratio of 1:2.75 to 1:3.75, insolubilized with at least 0.5 mole zinc hydroxychloride, having the formula $Zn_5(OH)_8Cl_2$ or $Zn_5(OH)_8Cl_2 \cdot H_2O$, per mole of said sodium silicate.

8. The article of claim 7 wherein said substrate is Portland cement concrete.

9. The article of claim 7 wherein said substrate is silicate mineral-surfaced asphalt roofing.

10. Exterior building material of claim 7 wherein said substrate is concrete.

11. A concrete roofing tile having a surface thereof coated with a hard, durable, water-insoluble, water-permeable, weather-resistant, inorganic, algicidal coating of a normally water-soluble sodium silicate, having an $Na_2O:SiO_2$ weight ratio of 1:2.75 to 1:3.75, insolubilized with at least 0.5 mole zinc hydroxychloride, having the formula $Zn_5(OH)_8Cl_2$ or $Zn_5(OH)_8Cl_2 \cdot H_2O$, per mole of said sodium silicate.

* * * * *

UNITED STATES PATENT AND TRADEMARK OFFICE
CERTIFICATE OF CORRECTION

PATENT NO. : 4,088,810
DATED : May 9, 1978
INVENTOR(S) : James R. Lodge

It is certified that error appears in the above–identified patent and that said Letters Patent are hereby corrected as shown below:

Col. 2 l. 43: "Pd" should read -- PD --.

Col. 2 l. 57: "$Zn_5(OH)_8Cl_2 \cdot H_2O$" should read -- $Zn_5(OH)_8Cl_2 \cdot H_2O$ --

Col. 5 l. 4: "2.45" should read -- 24.5 --.

Col. 5 l. 49: "panting with conventional pants" should read
-- painting with conventional paints --.

Col. 6 l. 42: "$Zn_5(OH)_8Cl_2 \cdot H_2O$" should read -- $Zn_5(OH)_8Cl_2 \cdot H_2O$ --.

Col. 6 l. 54: "$Zn_5(OH)_8Cl_2 \cdot H_2O$" should read -- $Zn_5(OH)_8Cl_2 \cdot H_2O$ --.

Col. 7 l. 5: "$Zn_5(OH)_8Cl_2 \cdot H_2O$" should read -- $Zn_5(OH)_8Cl_2 \cdot H_2O$ --.

Col. 8 l. 9: "$Zn_5(OH)_8Cl_2 \cdot H_2O$" should read -- $Zn_5(OH)_8Cl_2 \cdot H_2O$ --.

Signed and Sealed this

Thirty-first Day of October 1978

[SEAL]

Attest:

RUTH C. MASON
*Attesting Officer*

DONALD W. BANNER
*Commissioner of Patents and Trademarks*